United States Patent [19]

Yamamoto

[11] Patent Number: 5,141,787
[45] Date of Patent: Aug. 25, 1992

[54] AIR BAG

[75] Inventor: Kazuo Yamamoto, Kanagawa, Japan

[73] Assignee: Nippon Seiki K.K., Tokyo, Japan

[21] Appl. No.: 695,134

[22] Filed: May 3, 1991

[30] Foreign Application Priority Data

May 28, 1990 [JP] Japan .............................. 2-54588[U]

[51] Int. Cl.⁵ .................... B65D 30/10; B60R 21/00
[52] U.S. Cl. ......................... 428/35.5; 428/35.4;
428/36.1; 428/64; 428/102; 428/192; 280/728;
383/3; 112/440; 112/441; 112/269.1
[58] Field of Search ............. 280/727, 728, 731, 734,
280/732, 730; 383/3; 428/35.2, 35.4, 35.5, 35.7,
36.1, 64, 65, 102, 192; 112/440, 441, 262.1,
269.1

[56] References Cited

U.S. PATENT DOCUMENTS

| | | | |
|---|---|---|---|
| 2,122,526 | 7/1938 | Kattermann | 112/441 |
| 3,123,035 | 3/1964 | Jamison | 112/269.1 |
| 3,807,754 | 4/1974 | Rodenbach et al. | 280/150 AB |
| 3,917,023 | 11/1975 | De Rosa | 280/150 AB |
| 4,477,503 | 10/1984 | Fraioli | 428/102 |
| 4,499,131 | 2/1985 | Knox | 428/102 |
| 4,556,236 | 12/1985 | Scholz et al. | 280/729 |
| 4,580,514 | 4/1986 | Hanyu | 112/441 |
| 4,805,930 | 2/1989 | Takada | 280/728 |
| 4,828,286 | 5/1989 | Föhl | 280/731 |

FOREIGN PATENT DOCUMENTS 52-124079 10/1977 Japan .

Primary Examiner—Ellis P. Robinson
Assistant Examiner—Rena L. Dye
Attorney, Agent, or Firm—Sughrue, Mion, Zinn Macpeak & Seas

[57] ABSTRACT

An air bag has a pair of circular fabrics overlapping one upon the other with their marginal portions being stitched by crossing a sewing thread on the side of their edges to form a seam so that the seam is showing. The marginal end portions can be neatly enwrapped by the seam, not only providing the air bag with an unimpaired appearance but also making it compact when folded.

17 Claims, 4 Drawing Sheets

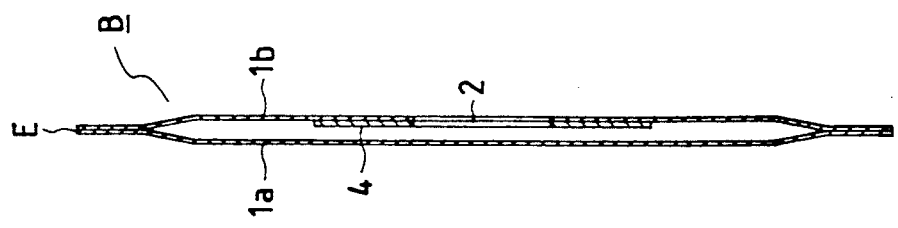
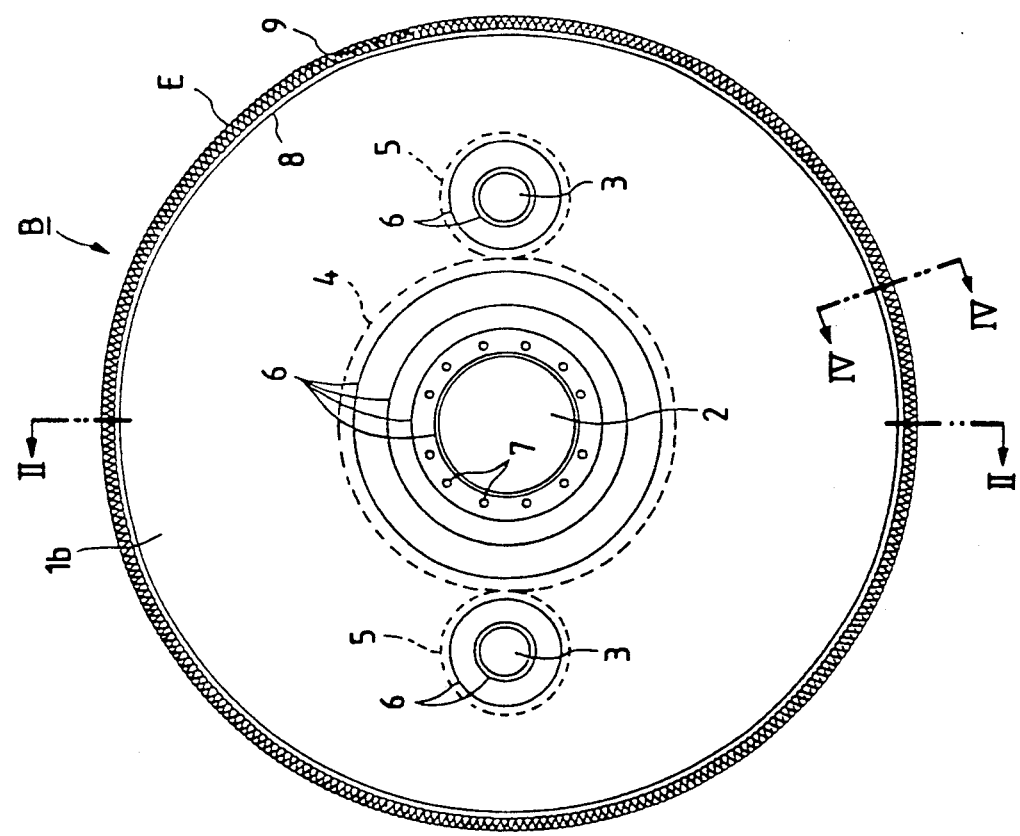

AIR BAG

BACKGROUND OF THE INVENTION

The invention relates to air bags that are used to protect drivers in the event of a collision between motor vehicles.

As shown in FIG. 8, an air bag B is mounted on a hub body of a steering wheel S of a motor vehicle, and this air bag B is inflated by a pressurized gas that will be charged thereinto in the event of a collision of the motor vehicle so that a driver D can be protected.

A conventional method of sewing such an air bag comprises the steps of: either overlapping a pair of circular fabrics one upon the other; sewing the overlapping marginal portions in two lines of stitching; and reversing the right and wrong sides so that the two lines of stitching at the marginal end portions are hidden in the inside of the air bag; or regularly sewing the marginal portions of the pair of overlapping circular fabrics; reversing the right and wrong sides; and sewing the marginal portions of the reversed sides so that the marginal end portions can be similarly hidden in the inside of the air bag.

Such reversing serves to make the air bag look nice, but at the same time, it not only complicates the sewing, but also makes it difficult to fold the air bag so compact as to allow it to be accommodated within a limited space provided at the center of the steering wheel, because the edge portion of the reversed air bag becomes bulky.

The invention has been made in view of the above circumstances. Accordingly, an object of the invention is to provide an air bag whose volume as folded is so compact as to allow it to be accommodated in place without involving the reversing operation or losing its aesthetic appearance.

SUMMARY OF THE INVENTION

To achieve the above object, the invention is applied to an air bag in which a pair of circular fabrics overlap one upon the other and their marginal portions are stitched by crossing a sewing thread or sewing threads on the side of their edges to form a seam so that the seam is showing.

Although the seam is showing and the sewn fabrics are not reversed, the marginal portions are stitched with the sewing thread(s) in such a manner that the sewing thread(s) crosses at their edges. Therefore, the marginal end portions are neatly enwrapped, providing the air bag with an unimpaired appearance. In addition, the absence of the reversing allows the volume of the air bag as folded to be reduced, thereby making the air bag compact.

BRIEF DESCRIPTION OF THE DRAWINGS

FIG. 1 is a bottom view of an embodiment of an air bag according to the present invention;

FIG. 2 is a sectional view taken along a line II—II shown in FIG. 1;

DETAILED DESCRIPTION OF THE PREFERRED EMBODIMENTS

Figure 3:
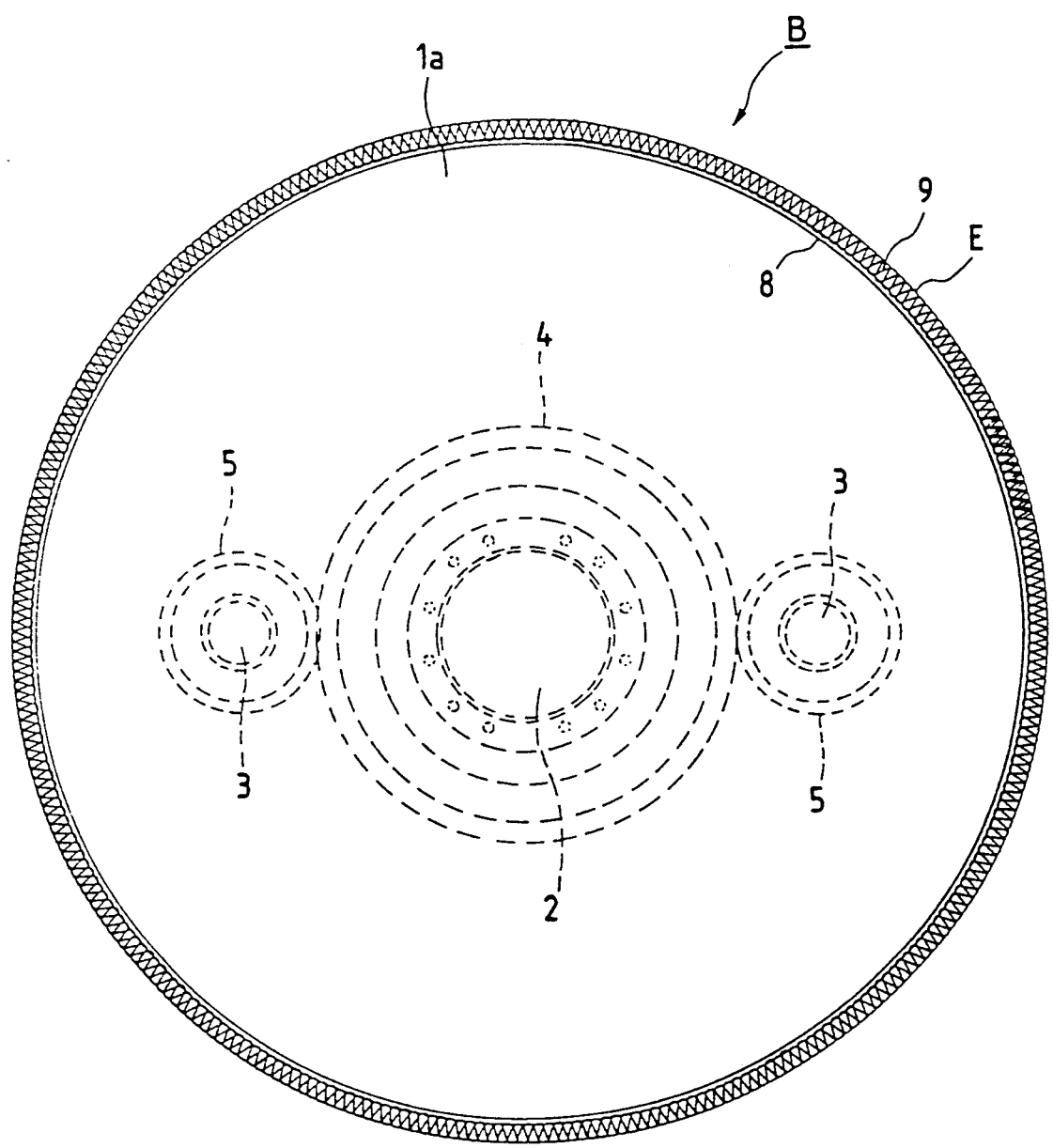
FIG. 3 is a top view of the embodiment.

FIGS. 1 to 4 show an air bag B, which is an embodiment of the invention.

The air bag B consists of an upper fabric 1a and a lower fabric 1b. These fabrics 1a, 1b are formed of an elastic woven fabric such as nylon or polyester, one surface thereof being coated with rubber, resin, or the like, and are cut in a circular form. The upper fabric 1a has no special holes, while the lower fabric 1b is provided with an opening 2 to allow a pressurized gas generator to be mounted in the middle thereof. On both sides of the opening 2 are gas-discharging holes 3. The opening 2 and the gas-discharging holes 3 have patches 4, 5 applied to the wrong side and regularly sewn by a sewing thread 6. Reference numeral 7 designates bolt-inserting holes for fixing the pressurized gas generator.

The pair of fabrics 1a, 1b overlap one upon the other and are stitched with sewing threads 8, 9 in the interlocking form at their overlapping marginal portions. The sewing thread 8 is used to sew inner marginal portions in two lines of stitching, while the sewing thread 9 is used to stitch the outer marginal portions at a predetermined pitch so that it crosses at the edge E. The thus sewn marginal end portions are not hidden in the inside by reversing the pair of fabrics as in the conventional air bag, but remain exposed. However, owing to the stitching by the sewing thread 9 which enwraps the edge E from outside, its appearance is not impaired at all.

Figure 4:
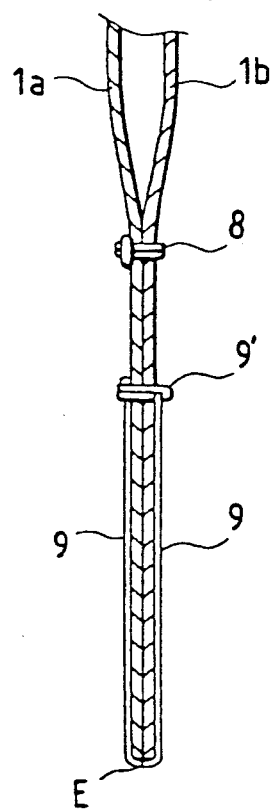
FIG. 4 is an enlarged sectional view taken along a line IV—IV shown in FIG. 1.
Figure 5:
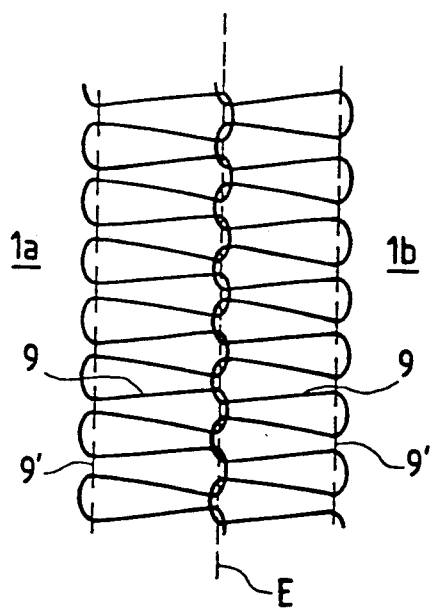
FIG. 5 is a development view in which a seam of marginal portions of the air bag is developed on a plane with the edge E as the center.

As shown in FIGS. 4 and 5, the sewing thread 9 is arranged separately for each of the fabrics 1a, 1b. These sewing threads 9, 9 are used to stitch the marginal end portions by interlacing themselves at the edge E. Reference numeral 9' designates a sewing thread for catching such stitched threads 9, 9.

Figure 6:
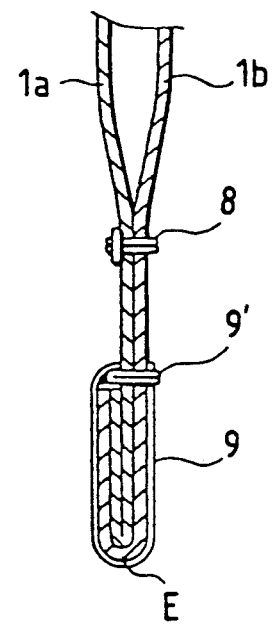
FIG. 6 is an enlarged sectional view showing another air bag in terms of a portion corresponding to that shown in FIG. 4.
Figure 7:
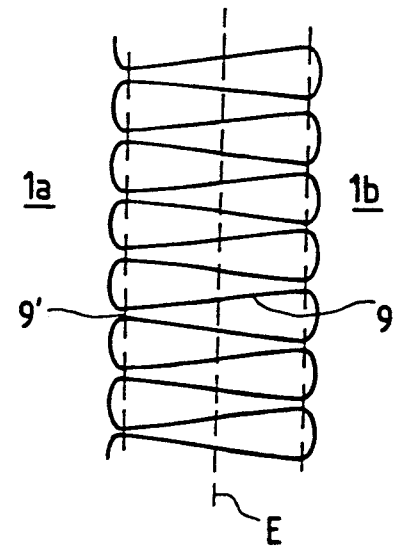
FIG. 7 is a development view showing the air bag in FIG. 6 in terms of a portion corresponding to that shown in FIG. 5.
Figure 8:
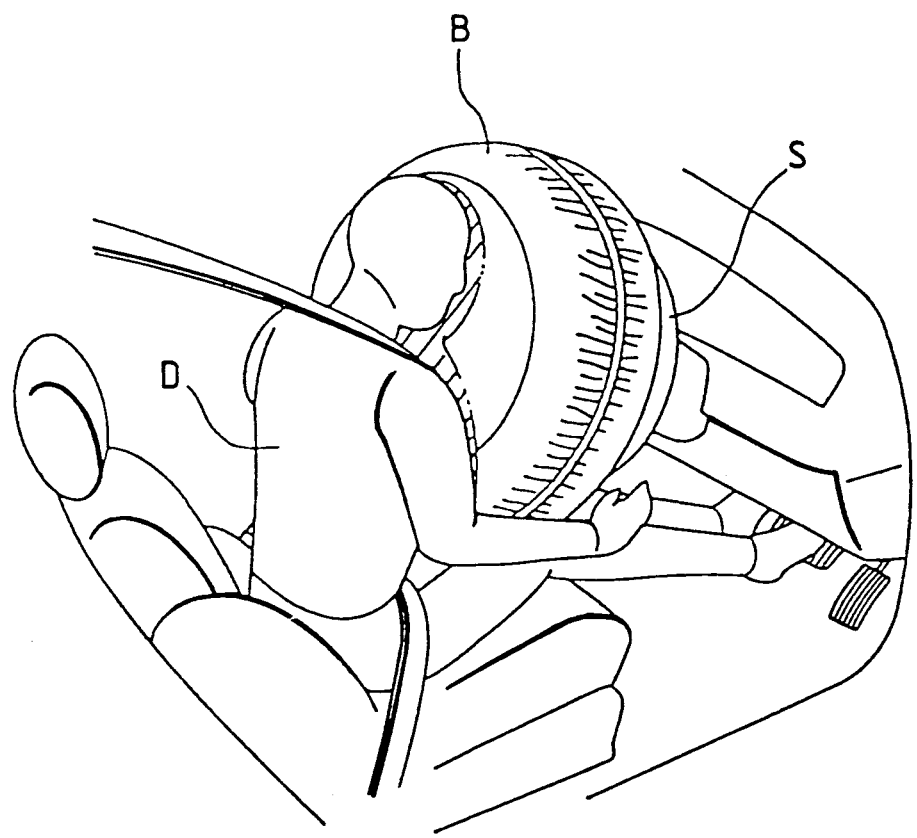
FIG. 8 is an air bag mounted on a motor vehicle.

The sewing thread 9 is not necessarily arranged separately on each of the fabrics 1a, 1b as in the above embodiment, but may be arranged so that a single piece of sewing thread 9 is used to stitch the marginal portions in such a manner as to alternately spread over both fabrics 1a, 1b as shown in FIGS. 6 and 7.

In an embodiment shown in FIG. 6, the marginal end portions of both fabrics 1a, 1b are folded back inwardly together and stitched as folded by the sewing thread 9. The stitching with the marginal end portions folded back, or hemstitching, contributes to further catching the sewing of the outer peripheral portions.

The thus constructed air bag has its seam exposed and has its pair of fabrics 1a, 1b not reversed. Therefore, the reversing process after the sewing can be dispensed with, thereby simplifying its overall sewing process. In addition, the pair of fabrics can be cut circularly and sewn simultaneously by an interlock sewing machine with the marginal portions thereof being cut roughly, thereby allowing the sewing process to be shortened significantly. Absence of the reversing of the fabrics contributes to reducing the volume of the air bag as folded, thereby allowing the folded air bag to be compact for accommodation in the steering wheel.

Further, although the air bag does not have the pair of fabrics 1a, 1b reversed after having them joined by stitching the marginal portions, the edge where the marginal portions meet is stitched by the sewing thread, and this neatly enwraps the marginal end portions, thereby preventing the appearance of the air bag from being impaired.

As described in the foregoing, according to the air bag of the invention, the seam is not reversed and is left exposed. Therefore, the conventional process of reversing can be dispensed with, thereby contributing to simplifying the overall sewing process. In addition, the nonreversing of the seam of the fabrics reduces the volume of the air bag as folded, thereby allowing the air bag to be compact. Further, the marginal portions of the fabrics are stitched with the sewing thread(s) so that the sewing thread(s) crosses at the edge, thereby allowing the marginal end portions to be enwrapped neatly. Thus, the nonreversing of the fabrics does not lead to impairment of the appearance of the air bag.

Moreover, the air bag can be sewn simultaneously with cutting, thereby contributing to simplifying its sewing process as well.

What is claimed is:

1. An air bag, comprising:
    a pair of circular fabrics overlapping one another to form overlapping marginal portions having peripheral edge portions, said overlapping marginal portions being stitched by crossing a sewing thread in a radical direction of said fabrics over said peripheral edge portions to form a seam, said seam being exposed.

2. An air bag according to claim 1, wherein a first piece of said sewing thread is arranged on said first fabric and a second piece of said sewing thread is arranged on said second fabric, and said first and second pieces of said sewing thread are interlaced at said peripheral edge portions where said marginal portions meet.

3. An air bag according to claim 2, further comprising:
    a catching thread for holding said first and second pieces of said sewing thread at a position inward from said peripheral edge portions.

4. An air bag according to claim 1, wherein said sewing thread comprises a single piece of sewing thread for stitching said peripheral edge portions, said single piece of said sewing thread being alternately spread over both said first fabric and said second fabric.

5. An air bag according to claim 4, further comprising:
    a catching thread for holding said single piece of said sewing thread at a position inward from said peripheral edge portions.

6. An air bag, comprising:
    a pair of circular fabrics overlapping one another to form overlapping marginal portions having peripheral edge portions, said overlapping marginal portions being folded inwardly, said inwardly folded marginal portions being stitched by crossing a sewing thread in a radical direction of said fabrics over said peripheral edge portions to form a seam, said seam being exposed.

7. An air bag according to claim 6, wherein a first piece of said sewing thread is arranged on said first fabric and a second piece of said sewing thread is arranged on said second fabric, and said first and second pieces of said sewing thread are interlaced at the peripheral edge portions.

8. An air bag according to claim 7, further comprising:
    a catching thread for holding said first and second pieces of said sewing thread at a position inward from said peripheral edge portions.

9. An air bag according to claim 6, wherein said sewing thread comprises a single piece of sewing thread for stitching said peripheral edge portions, said single pieces of said sewing thread being alternately spread over both said first fabric and said second fabric.

10. An air bag according to claim 9, further comprising:
    a catching thread for holding said single piece of said sewing thread at a position inward from said peripheral edge portions.

11. A method of sewing an air bag, said method comprising the steps of:
    overlapping a pair of circular fabrics; and
    stitching overlapping marginal portions having peripheral edge portions of said pair of fabrics by crossing a sewing thread in a radical direction of said fabrics over said peripheral edge portions to form a seam while said pair of circular fabrics is cut, said seam being exposed.

12. An air bag according to claim 3, wherein said circular fabrics comprise an elastic material, each of said circular fabrics having a surface coated with rubber.

13. An air bag according to claim 3, wherein said circular fabrics comprise an elastic material, each of said circular fabrics having a surface coated with resin.

14. An air bag according to claim 3, wherein one of said circular fabrics has an opening formed therein.

15. An air bag according to claim 8, wherein said circular fabrics comprise an elastic material, each of said circular fabrics having a surface coated with rubber.

16. An air bag according to claim 8, wherein said circular fabrics comprise an elastic material, each of said circular fabrics having a surface coated with resin.

17. An air bag according to claim 8, wherein one of said circular fabrics has an opening formed therein.

* * * * *